Patented July 31, 1928.

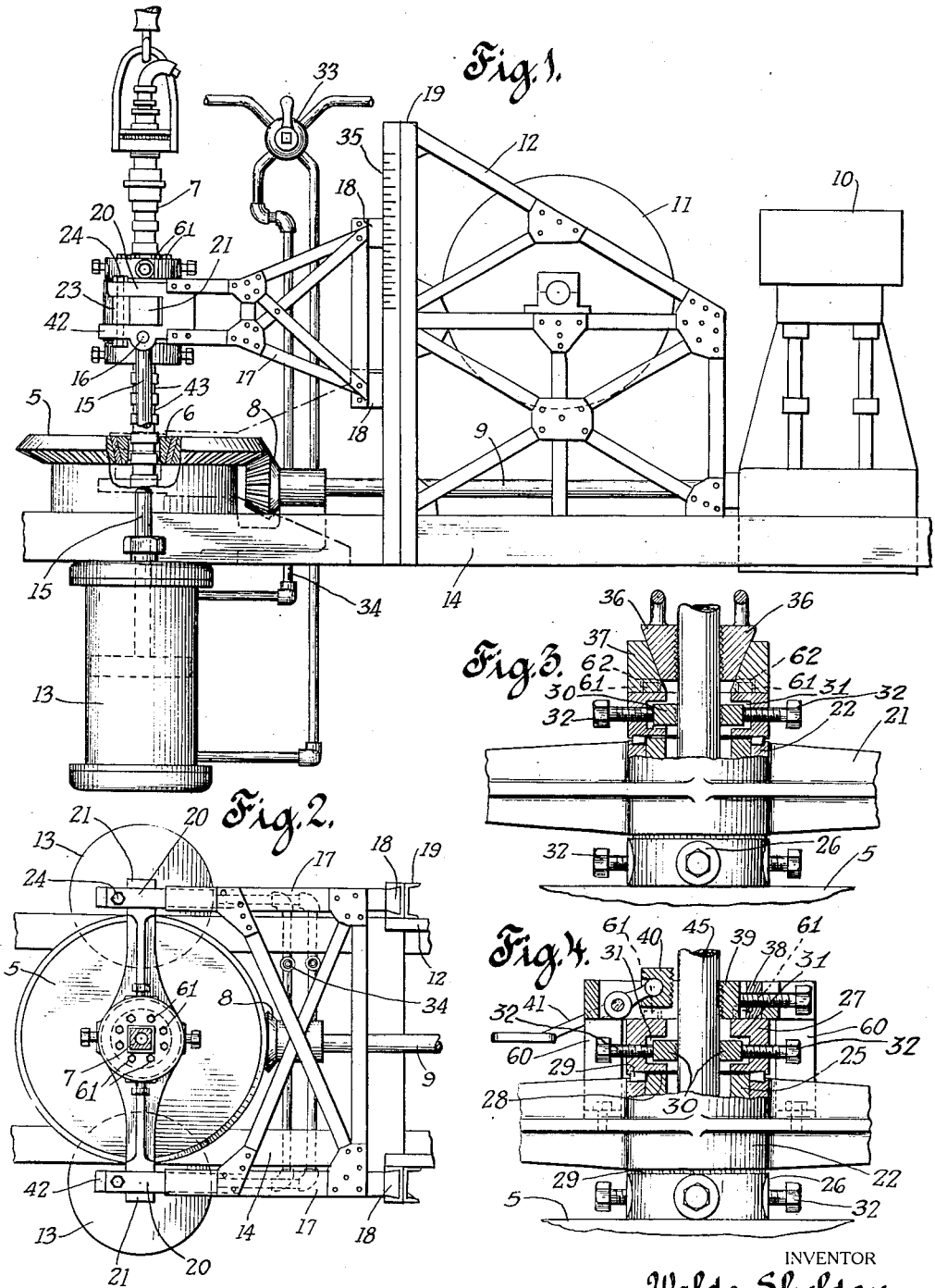

1,678,881

UNITED STATES PATENT OFFICE.

WALDO SHELDON, OF GREENWICH, CONNECTICUT.

WELL-DRILLING APPARATUS.

Application filed October 11, 1923. Serial No. 667,946.

This invention relates to the "rotary" type of well drilling apparatus in which the drill stem is driven by a rotary table. In this type of apparatus the weight of the drill stem has usually been relied upon to supply the drilling pressure and the lifting of the drill has been effected by means of a hoist. It has been proposed to apply a positive drilling force by means of a power cylinder mounted directly over the rotary table, but this heavy cylinder supported high above the table sets up objectionable vibrations, stands in the way of the tools usually employed in drilling operations and this heavy mechanism must be supported in temporary fashion so that it can be shifted bodily to one side when the sections of drill stem or casing are being added or taken off. This form of mechanism also is limited to a comparatively short feed stroke.

The objects of the present invention are to provide powerful and accurately controlled, well balanced mechanism for positively feeding the drill and for raising or lowering the same, which can remain in position without interfering with the usual drilling operations and which can give practically any desired length of feed stroke.

Figures 1 and 2 are broken, side and plan views of a form of the invention developed for driving deep oil wells.

Figures 3 and 4 are broken sectional views illustrating the use of special holding means for the drill stem.

The rotary table 5 is shown provided at its center with a bushing 6 having a sliding driving fit with the angular drill stem 7 and as driven by a bevel pinion 8 on shaft 9 operated by a steam engine or other motor 10. A hoist such as generally employed with rotary drills is indicated at 11, mounted with the motor on a frame or bed 12.

The power mechanism comprises a pair of fluid pressure cylinders 13 mounted on the floor beams 14 and partly beneath the rotary table so that the piston rods 15 projecting therefrom extend up at opposite sides of the table. These rods are connected by removable pins 16 with the forwardly projecting sides of a frame or cross head 17 which at its rear has shoes 18 sliding in upright guides 19 forming part of the hoist frame.

In Figure 2 the sides of the cross head are shown spaced widely enough to clear the table when the cross head is lowered, as indicated in broken lines in Figure 1, and as having jaws or forks 20 to receive the ends of the arms 21 projecting from the chuck sleeve 22 and forming in effect a cross beam extending across the top of the table. Blocks 23 held by bolts 24 detachably secure this yoke in the cross head.

The sleeve of the yoke surrounds the body of the chuck 25 and is confined rotatably thereon between outstanding thrust shoulders 26, 27, the latter of which is shown constructed as a removable head held by bolts 61 and with shims 28 to permit adjustment for wearing of the thrust bearings 29. Slidable jaws 30 mounted in seats 31 in the upper and lower end portions of the chuck body are actuated by bolts 32.

By properly controlling the hydraulic or other fluid pressure through a suitable valve 33 and piping 34, any desired force can be applied either for feeding or for lifting the drill and the action may be accurately regulated by watching the sliding movement of the cross head with respect to the scale 35 on the upright guide.

The yoke may be disconnected from the cross head after uncoupling the drill stem or disconnecting the chuck from the stem, after which the cross head may be lowered to the floor, leaving the table clear and unimpeded. Also, if desired, the chuck may be lowered down onto the table and the drill stem be then supported by "slips" 36 dropped into a spider 37 rested directly on top of the chuck body, as in Figure 3, or by a holding dog 38 rested directly on the chuck body and having the usual stationary and movable jaws 39, 40, the latter adapted to be tripped by a pedal 41. The spider and holding dog are indicated as recessed at 62 to fit over the chuck head bolts 61 when seated on the chuck body. The lower jaws of the cross head arms are shown with projecting lips 42 to serve as gages and rests for facilitating the re-engagement of the yoke arms in the cross head.

The grief stem is shown as provided with seats 43 in the sides of the same spaced for engagement by the jaws in the upper and lower ends of the chuck to prevent slippage of the chuck over the drill stem.

With this invention any desired pressure or lifting force is applied to the rotating drill stem, without interfering with the usual drilling operations and the power mechanism is mounted low in fixed position and off to one side of the rotary table where it does not interfere with the necessary drilling operations. Also because of the lowered center of support and the fixed mounting, the power device can be constructed with practically any desired length of feed stroke. The foot clamp in Figure 4 may be steadied by providing it with dependent braces 60 engaging the arms of the cross beam.

What I claim is:

1. In well drilling apparatus, a rotary table supported for rotation in a fixed plane and having a passage for the drill stem, a chuck having a body to be secured to and rotate with the drill stem and a non-rotating thrust transmitting member with projecting arms and power mechanism detachably connected with said arms for raising the chuck or for lowering the same into supported position upon the table.

2. In well drilling apparatus, a rotary table having a passage for the drill stem, a vertically reciprocating cross head having forked side arms and a drill stem chuck having projecting arms detachably engageable with said forks.

3. In well drilling apparatus, a rotary table having a passage for the drill stem, a vertically reciprocating cross head having forked side arms and a drill stem chuck having projecting arms detachably engageable with said forks, the lower jaws of the forks extending beyond the upper jaws to serve as guides for the entry of the chuck arms into the forks.

4. Well drilling apparatus comprising a rotary table having a drill stem rotating chuck, power cylinders below the table and having piston rods extending upward at opposite edges of the table and a drill stem chuck having radially extending arms acted on by said piston rods, said arms being detachably engaged with a vertically reciprocating cross head supported at one side of the table and adapted to be lowered clear of the table.

5. In well drilling apparatus, a rotary table having a passage for the drill stem, a vertically reciprocating cross head having side arms spaced to pass to opposite sides of the table so that the same may be lowered clear of the table and a drill stem chuck having projecting arms detachably engageable with the side arms of the cross head.

6. In well drilling apparatus, a rotary table journaled to rotate in a fixed horizontal plane and having a central passage for slips, adapters and the like ordinarily employed in rotary drilling operations, drive gearing for rotating said table also mounted in fixed position and below the level of the table top so as to leave the top of the table clear and unobstructed for rotary drilling operations, power cylinders at the sides of and below the level of the table, said cylinders having pistons therein with piston rods extensible up past the edges of the fixedly supported table and adapted to be lowered out of the way down below the level of the table, chuck mechanism including a chuck body provided with means to make adjustable gripping engagement with a drill stem and a non-rotating thrust transmitting sleeve having radially projecting arms detachably engageable in driven relation to the piston rods of the power cylinders and a sliding cross head for guiding the vertical movements of the chuck mechanism and adapted to be positioned clear of the table when said table is being used for straight rotary drilling.

7. In well drilling apparatus, a rotary table mounted to rotate in a fixed horizontal plane and having a chuck passage for rotating the drill stem, a chuck having a body adjustably engageable and rotatable with the drill stem and a non-rotating thrust transmitting member provided with radially projecting arms, power devices at the sides of the fixedly supported rotary table and connections therefrom for applying lifting and lowering force to the ends of the radially projecting arms of the non-rotating thrust transmitting member of the drill chuck, including a vertically reciprocating cross head detachably engaged with the arms of the thrust transmitting member.

8. In well drilling apparatus, the combination with a rotary table having a central passage for the drill stem and supported for rotation in a fixed low plane substantially at the level of the derrick floor, a hollow driven member having a vertically sliding driven engagement in said passage and including a head structure adapted to be lowered into supported position upon said rotary table, said head structure comprising pipe gripping devices and a thrust transmitting collar with oustanding arms, power cylinders supported at the sides of the table and having pistons with piston rods rising at the sides of the table above the derrick floor, means for detachably connecting the upper ends of the piston rods with the arms of the thrust collar and whereby said piston rods may be lowered clear of the table top when the head structure is lowered into supported relation on the table.

9. In well drilling apparatus, the combination of a rotary table supported for rotation in a fixed horizontal plane substantially at the level of the derrick floor and provided with a central passage for driving a grief stem, a grief stem having a sliding driven engagement in said table, a chuck head removably and adjustably connected with said grief stem and including a relatively rotatable cross beam extending across the table and power cylinders located at opposite sides of the table and having piston rods rising at the sides of the table, said piston rods having readily disconnectible power applying connections with said cross beam and means for accurately controlling application of power fluid to said cylinders.

10. In well drilling apparatus, the combination of a rotary table mounted for rotation in a fixed plane substantially at the level of the derrick floor, power cylinders mounted partly beneath said rotary table and having pistons with piston rods extending up past the edge of the table and closely adjacent thereto, a cross beam extending across the table, the upper ends of the piston rods having detachable connection with the ends of said beam for raising and lowering the same, a tubular member having a sliding rotatively driven engagement in the table and a rotative bearing in the cross beam.

In witness whereof, I have hereunto set my hand this 3rd day of October, 1923.

WALDO SHELDON.